Dec. 23, 1941. I. HOPFENBERG 2,267,590
METHOD OF MAKING ARTICLES OF JEWELRY
Filed March 15, 1939
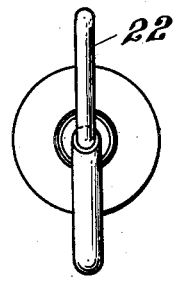
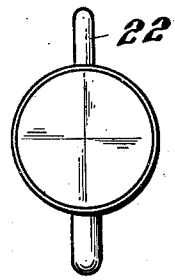
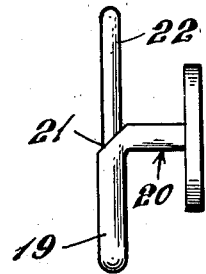
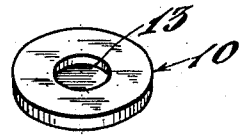
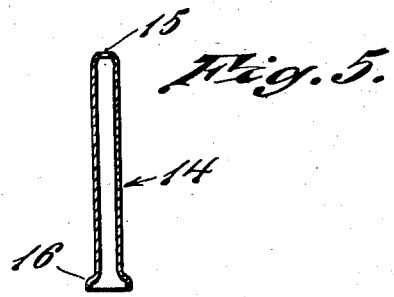
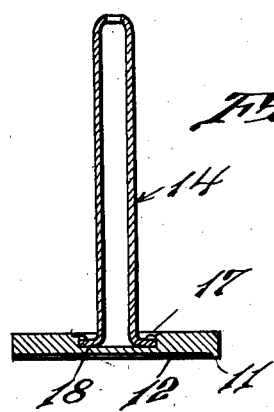
INVENTOR.
Irving Hopfenberg
BY Barlow & Barlow
ATTORNEYS.

Patented Dec. 23, 1941

2,267,590

UNITED STATES PATENT OFFICE 2,267,590

METHOD OF MAKING ARTICLES OF JEWELRY

Irving Hopfenberg, Providence, R. I., assignor to Freeman-Daughaday Company, a corporation of Massachusetts Application March 15, 1939, Serial No. 261,890

1 Claim. (Cl. 29—160.6)

This invention relates to a method of making an article of jewelry, more particularly to men's jewelry, such as a shirt stud, a cuff link or the like, and has for one of its objects to provide a simple and effective means of securing a shank to a head without the use of solder.

Another object of the invention is to provide a simple and effective manner of mechanically attaching a head to a stud without the necessity of thickening up the head and by maintaining the parts thin and light in weight.

Another object of the invention is to provide a connection between two parts by the recessing of one part and flanging the other part with the stock rolled over the flange to hold the parts firmly in fixed relation.

With these and other objects in view, the invention consists of certain novel features of construction, which will be more fully described, and particularly pointed out in the appended claim.

In the accompanying drawing:

Fig. 1 is a back plan view of a shirt stud;

Fig. 2 is a top plan view thereof;

Fig. 3 is a side elevation;

Fig. 4 is a perspective view of the head of the jewelry article alone;

Fig. 5 is a sectional view of the stud portion which is to be connected to the head; and Fig. 6 is a sectional view of Figs. 4 and 5 combined and held in fixed relationship.

In the making of headed cuff links, buttons or studs, solder is frequently used for the attachment of the shank to the head. Soldering discolors the parts and requires a skilled workman to perform the soldering operation; and in order to simplify the assembly operations and to do away with soldering, I have provided a recess in the back of the head which may be struck into the head at the same time that the front embellished surface is provided and then by enlarging the end of the tubular shank and placing it in this recess, I am enabled to force some of the stock around the recess over the head of the stud, further deflecting the stud and making a very firm connection without increasing the thickness of the head, which is exceedingly desirable where light-weight buttons, studs, or the like, are desired, and the following is a more detailed description of the present embodiment of this invention, illustrating the preferred means by which these advantageous results may be accomplished:

With reference to the drawing, 10 designates the head member which is struck to provide a peripheral rib 11 about its edge, and a recess as at 12 on its front surface, while it is at the same time provided with a recess 13 in its rear surface which is best illustrated in Fig. 4.

The shank 14 is drawn tubular in shape as illustrated in Fig. 5, having a pierced end 15 and an enlarged end portion 16, shaped somewhat as illustrated in Fig. 5. The enlarged end 16 is placed within the recess 13 and then the stock 17 about the recess 13 is forced over the enlarged end 16 to flatten this enlarged end providing a flange as at 18 and securely anchoring the shank 14 to the head.

By suitable bending this shank may be formed with a portion 19 at right angles to the portion 20, as shown in Fig. 3, and by cutting off the outer corner of the bend as at 21, an opening is provided for the insertion of a spring plunger 22 which may be forced into the tubular portion 19 against a spring which will eject the plunger when the pressure of forcing it inwardly is relieved.

By the arrangement above described, I have provided a connection which eliminates the use of solder and yet provides a very firm attachment of parts one with reference to the other and makes unnecessary under-cutting or a thick head which would be necessary should such under-cutting be attempted.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

The method of attaching two parts of a jewelry article together which consists in forming a head with a circular recess therein bounded only by a bottom wall and a side wall, forming a separate tubular shank with an enlarged end portion having a tapered section terminating in a cylindrical end section, placing said enlarged end entirely in said recess, and then forcing the stock of the head about said recess over said enlarged end to flatten and spread both sections of said enlarged end in said recess to form therein an annular flange having its peripheral edge in tight frictional engagement with the side wall of said recess, and while deforming the stock of the head to depress it inwardly of the recess to frictionally grip the circumferential border portion of the adjacent side face of said annular flange.

IRVING HOPFENBERG.